United States Patent
Korotaev

(10) Patent No.: US 11,550,899 B2
(45) Date of Patent: Jan. 10, 2023

(54) SYSTEMS AND METHODS FOR HARDENING SECURITY SYSTEMS USING LIVE PATCHING

(71) Applicant: Cloud Linux Software Inc., Estero, FL (US)

(72) Inventor: Kirill Korotaev, Moscow (RU)

(73) Assignee: Cloud Linux Software Inc., Estero, FL (US)

( * ) Notice: Subject to any disclaimer, the term of this patent is extended or adjusted under 35 U.S.C. 154(b) by 417 days.

(21) Appl. No.: 16/600,659

(22) Filed: Oct. 14, 2019

(65) Prior Publication Data

US 2021/0026949 A1 Jan. 28, 2021

Related U.S. Application Data

(63) Continuation-in-part of application No. 16/518,325, filed on Jul. 22, 2019, now Pat. No. 11,409,862.

(51) Int. Cl.
| | |
|---|---|
| G06F 21/54 | (2013.01) |
| G06F 21/57 | (2013.01) |
| G06F 8/71 | (2018.01) |
| G06F 21/55 | (2013.01) |
| G06F 8/656 | (2018.01) |

(52) U.S. Cl.
CPC ............. *G06F 21/54* (2013.01); *G06F 8/656* (2018.02); *G06F 8/71* (2013.01); *G06F 21/554* (2013.01); *G06F 21/572* (2013.01); *G06F 21/577* (2013.01)

(58) Field of Classification Search
CPC . G06F 21/54; G06F 8/656; G06F 8/71; G06F 21/554; G06F 21/572; G06F 21/577
See application file for complete search history.

(56) References Cited

U.S. PATENT DOCUMENTS

| | | | | |
|---|---|---|---|---|
| 6,247,175 B1 * | 6/2001 | Ledford | ................ | G06F 8/4435 717/157 |
| 7,735,078 B1 * | 6/2010 | Vaidya | ................ | G06F 9/44547 717/172 |
| 7,904,959 B2 * | 3/2011 | Sidiroglou | ............ | G06F 21/554 726/22 |
| 8,352,923 B2 * | 1/2013 | Lopian | ................ | G06F 11/3668 703/22 |

(Continued)

OTHER PUBLICATIONS

Maurer, Matthew, and David Brumley. "TACHYON: Tandem execution for efficient live patch testing." 21st USENIX Security Symposium (USENIX Security 12). 2012 (Year: 2012).*

(Continued)

*Primary Examiner* — Syed A Zaidi
(74) *Attorney, Agent, or Firm* — ArentFox Schiff LLP; Michael Fainberg

(57) ABSTRACT

Systems and methods are provided for reducing attack surface of a software environment by removing code of an unused functionality. A security hardening module may identify a portion of code of a software, the software comprising at least one of: an operating system and an application. The security hardening module may determine whether the portion is being utilized, and in response to determining that the process is not being utilized, the security hardening module may generate a live patch that removes the portion from the code and may modify, during runtime, the software using the live patch without restarting the software.

6 Claims, 7 Drawing Sheets

(56) References Cited

U.S. PATENT DOCUMENTS

| | | | | |
|---|---|---|---|---|
| 2003/0101330 A1* | 5/2003 | Duesterwald | ......... | G06F 9/3017 |
| | | | | 712/32 |
| 2008/0141374 A1* | 6/2008 | Sidiroglou | ............ | G06F 21/554 |
| | | | | 726/23 |
| 2009/0323568 A1* | 12/2009 | Hoffmann | ............. | H04W 84/10 |
| | | | | 370/310 |
| 2014/0101644 A1* | 4/2014 | Buzaski | .................. | G06F 8/656 |
| | | | | 717/168 |
| 2016/0140021 A1* | 5/2016 | Lopian | ................ | G06F 11/3688 |
| | | | | 717/130 |
| 2016/0321036 A1* | 11/2016 | Schnepper | ................ | G06F 8/61 |
| 2016/0323301 A1* | 11/2016 | Boss | .................... | G06F 21/577 |
| 2019/0068640 A1* | 2/2019 | Araujo | .................... | G06F 21/53 |

OTHER PUBLICATIONS

Araujo, Frederico, et al. "From patches to honey-patches: Lightweight attacker misdirection, deception, and disinformation." Proceedings of the 2014 ACM SIGSAC conference on computerand communications security. 201 (Year: 2014).*

NPL Search Terms (Year: 2022).*

* cited by examiner

SYSTEMS AND METHODS FOR HARDENING SECURITY SYSTEMS USING LIVE PATCHING

CROSS-REFERENCE TO RELATED APPLICATIONS

This application is a Continuation in Part of U.S. patent application Ser. No. 16/518,325 filed on Jul. 22, 2019, which is hereby incorporated in its entirety, herein.

FIELD OF TECHNOLOGY

The present disclosure relates generally to the field of computer security, more specifically, to systems and methods of hardening security systems using live patching.

BACKGROUND

Maintaining security of live information technology software systems is a challenge. Although keeping operating systems and applications up to date and implementing intrusion detection systems help by making an intruder's attempt to access desired data more difficult, they have not resolved the deficiencies in cybersecurity. At best, these techniques may delay an attack or may inform users of an attack that has already occurred.

Rather than simply detecting intrusions, reducing an attack surface of a software environment should be also be an endeavor. Common strategies of attack surface reduction include reducing the amount of code running, reducing entry points available to untrusted users, and eliminating services seldom requested by users. Running less code and disabling unnecessary functionality helps prevent security failures because intruders are given fewer avenues to exploit a system. Simply running less code and disabling functionality, however, is not enough to thwart off an attack as an intruder may identify a way to enable functionality and begin running more code through acquired authorization. The intruder redirects his/her attention to disabling the security and then accessing the desired information in this scenario. While the security can be bolstered using regular updates, substantive updates typically require restarting the system. In environments where intruders are more likely to attack, such as server warehouses, frequently restarting systems is not an option because the servers are needed to perform various requests.

In view of these issues, there exists a demand for hardening security systems so as to reduce attack surface for software environments while enabling updates to be received without requiring restarts.

SUMMARY

A method for reducing attack surface of a software environment by removing code of unused functionality is thus provided. As mentioned previously, disabled functionality can be enabled by an intruder. Similarly, code that is not being run, can be run by an intruder. In order to properly reduce the attack surface and ensure that an intruder cannot exploit the software, the unused functionality needs to be removed from memory altogether or placed at a location inaccessible to the intruder (e.g., using data randomization). However, performing this removal/randomization is difficult because the functionality still needs to be readily available when called by an authorized user. In addition, the removal would require a software patch that actually alters the source code. Because normal patches cannot be installed during runtime, a typical patch approach is severely limited.

According to an exemplary aspect of the present disclosure, the method comprises a security hardening module that may identify a portion of source code of a software, the software comprising at least one of: an operating system and an application. A portion of code may comprise any form of code including, but not limited to, binary, intermediate representation, assembler, C, C++, or code in any other language. Software hardening refers to tools and techniques that reduce software vulnerabilities in applications, systems, infrastructure, firmware, etc. The security hardening module may determine whether the portion of the source code is being utilized (e.g., whether the functionality associated with the portion of the source code is being used or is needed), and in response to determining that the portion is not being utilized, may generate a live patch that removes the portion from the source code. The security hardening module may further modify, during runtime, the software using the live patch without restarting the software. More specifically, the modifying may comprise removing the portion from the source code such that the portion of the source code cannot be executed. This results in the functionality associated with the portion from being unusable.

In one aspect of the method, subsequent to the modifying, the security hardening module may detect a request to execute the portion and may generate a second live patch that adds the removed portion back to the source code. The security hardening module may then modify, during the runtime, the software using the second live patch without restarting the software, wherein the modifying using the second live patch may comprise adding the removed portion to the source code such that the portion can be executed.

In one aspect of the method, the security hardening module may generate a honeypot patch that comprises program code for generating a security event in response to detecting an attempt to exploit a software vulnerability. The security hardening module may modify, during the runtime, the software using the honeypot patch without restarting the software, wherein the modifying using the honeypot patch may comprise replacing the removed portion of the source code with the program code of the honeypot patch.

In one aspect of the method, the attempt to exploit the software vulnerability may specifically be an attempt to execute the process removed from the software. Thus, the security hardening module may modify the software using the honeypot patch by replacing the portion with the program code such that a request to execute the portion instead generates the security event.

In one exemplary aspect, attack surface may be reduced using data randomization and live patching. A security hardening module may generate a plurality of randomization live patches, wherein each randomization live patch comprises a respective technique for swapping data values within a data structure. In response to identifying software, the security hardening module may identify a first data structure associated with the software. The security hardening module may select a first randomization live patch from the plurality of randomization live patches and modify, during the runtime and without restarting the software, the software using the first randomization live patch such that data values within the first data structure are swapped and/or shifted in accordance with a first technique.

In one aspect of the method, the security hardening module may identify a second data structure associated with the software and may select, from the plurality of randomization live patches, a second randomization live patch different from the first randomization live patch. The security hardening module may modify, during the runtime and without restarting the software, the software using the second randomization live patch such that data values within the second data structure are swapped and/or shifted in accordance with a second technique different from the first technique.

In one aspect of the method, the security hardening module may modify the software periodically, during the runtime and without restarting the software, using any combination of the plurality of randomization live patches for at least one of the first data structure and the second data structure.

In one exemplary aspect of the present disclosure, a system for reducing attack surface of a software environment by removing code of unused functionality is provided. The system includes a hardware processor configured to (1) identify a portion of source code of a software, the software comprising at least one of: an operating system and an application, (2) determine whether the portion is being utilized, and in response to determining that the process is not being utilized, (3) generate a live patch that removes the portion from the source code and (5) modify, during runtime, the software using the live patch without restarting the software. More specifically, the modifying may comprise removing the portion from the source code such that the portion cannot be executed.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for reducing attack surface of a software environment by removing code of unused functionality. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
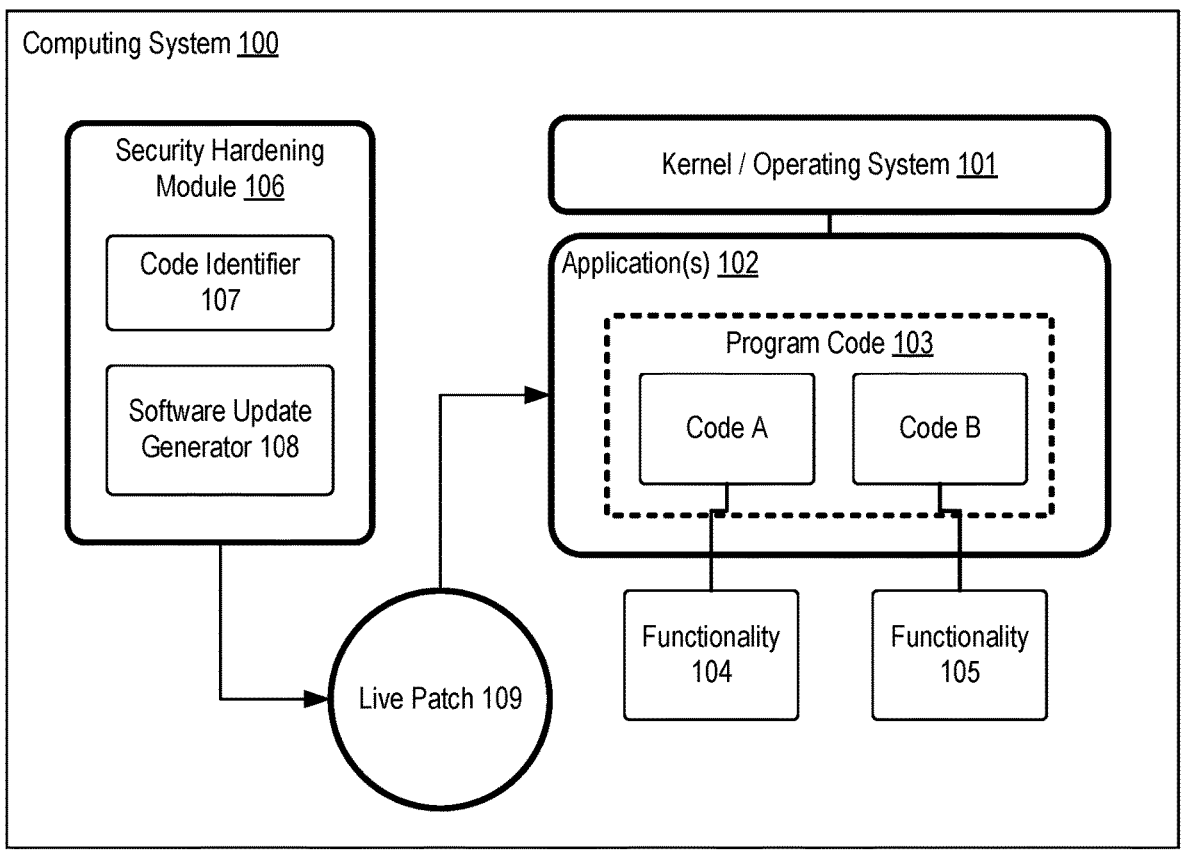
FIG. 1 is a block diagram illustrating a computing system with a security hardening module that generates live patches for attack surface reduction, according to an exemplary aspect.

FIG. 1 is a block diagram illustrating computing system 100 that comprises security hardening module 106 that generates live patches for attack surface reduction according to an exemplary aspect. Computing system 100 includes operating system (OS) 101 or applications 102 installed thereon. OS 101 is a type of system software configured to manage the execution of applications 102 and computer hardware resources of computing system 100, and may include common system services configured to facilitate such execution and management. A kernel is a computer program at the core of OS 101, controlling access to computing system 100's resources. Functionality of a kernel includes performing tasks such as running processes, managing memory allocation, managing hardware devices, handling interrupts, etc. Specifically, the kernel manages the central processing unit (CPU), random-access memory (RAM), and input/output (I/O) devices associated with computing system 100. OS 101 and applications 102 may be referred to collectively as the software of computing system 100. Computing system 100 may be any computing device, physical server, computer server, desktop, laptop, handheld device, tablet device, smartphone, or any other electronic device suitable for executing software program code as described herein.

Security hardening module 106 comprises two components: code identifier 107 and software update generator 108. In general, the term "module" as used herein can refer to a software service or application executed as part of computing system 101. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Applications 102 includes program code 103, which may represent the source code of applications 102. The source code may be divided into multiple sections or files. For simplicity, FIG. 1 depicts an application that has two processes: functionality 104 and functionality 105. Functionality 104 and functionality 105 may represent processes or features of applications 102 that modify data. A process is an instance of a computer program (e.g., applications 102) that is being executed by one or many threads. A process may be associated with resources such as an image of the execute machine code associated with applications 102, operating system (OS) descriptors of resources allocated to the process, security attributes, processor state, and memory that includes the executable code, a call stack, a heap to hold intermediate computational data, and input/output data. Information concerning these resources is held by the OS in a data structure known as a process control block (PCB).

A process may have a state that indicates whether it is running or has terminated. In typical computer environments, these states may include "created," "waiting," "running," "blocked" and "terminated." For example, a process is in the "created" state when being loaded from a storage device (e.g., a hard disk drive) into main memory. A process is in the "waiting" state when the process waits for a scheduler to perform a context switch and load the process into a processor. While the processor executes the process instructions, the process' state becomes "running." In a situation where a process needs to wait for a resource (e.g., a user input or a file), the process enters the "blocked" state. Lastly, when the process has finished execution, the process enters the "terminated" state, thus waiting to be removed from the main memory.

In FIG. 1, code A of program code 103 represents code that, when executed, enables functionality 104. Code B of program code 103 represents code that, when executed, enables functionality 105. Suppose that a user is accessing application 102 and is solely utilizing functionality 105, which is a process. In this scenario, the state of the process known as functionality 105 may be "running," and the state of functionality 104 may be "terminated." To reduce attack surface and ensure that an intruder cannot corrupt functionality 104, an exemplary aspect of this disclosure removes functionality 104 from memory altogether.

Specifically, security hardening module 106 uses code identifier 107 to first identify portions of program code 103 (e.g., code A and code B). Code identifier 107 may then determine whether a portion of code is being utilized. When assessing the utilization of the portion, code identifier 107 may specifically determine whether the code is essential to the user. For example, even if the code is running, the user may not actually be using the functionality associated with the code. Code identifier 107 may retrieve user settings from memory that may directly indicate the portions of code that are not essential to the user. Alternatively or additionally, code identifier 107 may monitor usage of various functionalities of a software to determine statistics such as average access time or number of access attempts on a functionality. In response to determining that a functionality has been accessed less than a minimum number of required access times or that the functionality has been used for less than a minimum amount of time, code identifier 107 may identify the functionality as not being utilized (e.g., not needed or optional). For example, code identifier 107 may determine that certain functionality such as unix sockets or debugfs is not used. Because of this, code identifier 107 may wipe the code associated with that functionality from the memory.

In some aspects, functionality may refer to a process. Code identifier 107 may thus access the PCB maintained by OS 101 for each process associated with applications 102. A particular PCB may provide details regarding a process such as process identification (PID), process state, process privileges, etc. Based on the process state (e.g., whether the process is running), code identifier 107 determines whether to forward the PID of the process to software update generator 108. For example, code identifier 107 may classify all processes without a "running" state as disabled functionality that can be removed. In some embodiments, code identifier 107 may classify only processes with a "terminated" state as disabled functionality that can be removed. The specific configuration of which process states should trigger a removal can be adjusted by a user accessing security hardening module 106. In some embodiments, code identifier 107 may identify all "running" processes as candidate processes for data randomization. This is further discussed in the description of FIG. 3.

In reference to FIG. 1, suppose that code identifier 107 determines that functionality 104 is not being utilized. Code identifier 107 may forward the PID of functionality 104 to software update generator 108, which may (1) identify the portion of program code 103 that gives functionality 104 its functionality and (2) generate live patch 109 that removes that portion from program code 103. For example, if applications 102 is a web browser, functionality 104 may be associated with generating a new tab on the browser interface. Software update generator 108 may determine that code A features a plurality of functions that are associated with the creation of the new tab and may generate a patch that removes code A from program code 103. As a result, an intruder may not be able to execute functionality 104 for initiating a new tab (e.g., to open a website that features malicious content such as malware).

In one aspect, software update generator 108 may be arranged in a two-component form, comprised of a patch management subcomponent and an update subcomponent. The patch management subcomponent (e.g., executing in user-level space) may be configured to create or retrieve from a predetermined library or data store one or more live patches associated with existing applications 102 and/or operating system 101 installed on computing system 100. The update subcomponent (e.g., executing as a kernel module) may be configured to execute a live patching mechanism that alters the workings of the operating system 101 and/or the user applications 102 as they are executing without requiring a restart of the software. Aspects of the present disclosure extend to other configurations of software update generator 108, including a single monolithic system service (e.g., executing in privileged or user level) or a micro-service based configuration.

Live patch 109 can be integrated into program code 103 without having to restart applications 102. Live patch 109 is applied to applications 102 using live patching techniques (also referred to as hot patching or dynamic software updates). Because applications 102 does not have to be restarted, a user can continue accessing applications 102 while the attack surface of applications 102 (and in connection the attack surface of OS 101) is being simultaneously reduced.

A live patching technique may involve modifying a software build system to make a compilation go through via an intermediate stage, rather than directly to the final object code (i.e., before generating the final object code, there may be intermediate stages with non-final object code). An analysis and comparison of the original and the modified intermediate (assembler, object or some other Intermediate Representation—IR) code results in the generation of the new, "Instrumented" intermediate (assembler, object or other IR) code. This instrumented intermediate (assembler, object or other IR) code is constructed in such a way that, if compiled and/or linked, the instrumented intermediate code produces the resulting file of the original binary code and the live patch update code in the very same file, including the information about which original code blocks should be replaced with new ones. The resulting file can be an object file (e.g., a Linux ELF file or some other platform-specific object file) with relocation information and sections. This technique and other examples of similar techniques for creating a live patch is described in further detail in U.S. Pat. No. 9,696,989, which is herein incorporated by reference.

It should be noted that just as functionality 104 is seamlessly removed from being executable, it should be seamlessly accessible should the user need it for authorized access. In this scenario, code identifier 107 may detect a request to initiate functionality 104. In response to determining that functionality 104 is currently removed from access via applications 102 (e.g., code identifier 107 may refer to the data structure that lists removed processes to search for the PID of functionality 104), code identifier 107 may determine whether the request originates from an authorized user. In response to determining that the request is from an authorized user, code identifier 107 may forward the PID to software update generator 108, which may generate another live patch that adds code A back into program code 103. In some embodiments, when generating a live patch that removes code A from program code 103, software update generator 108 may store a copy of code A in a data structure along with the associated PID of functionality 104. Thus, when receiving a PID from code identifier 107, software update generator 108 may search for the received PID in the data structure to retrieve the removed code A. Software update generator 108 may then modify applications 102 using the new live patch such that code A is added back into program code 103.

Security hardening module 106 may be split into a thick client that exists on an external server (not shown) and a thin client on computing system 100. For example, the thin client may comprise code identifier 107 and the thick client may comprise software update generator 108. In this configuration, computing system 100 receives software updates from the external server comprising a hardware processor that does a majority of the computation performed by security hardening module 106 (e.g., source code and processes matching, live patch generation, data randomization, etc.). The external server and computing system 100 may exchange data over a communication network such as the Internet. For example, the thin client may forward PIDs of processes not currently being executed at computing system 100 to the thick client and, in return, receive live patches removing those processes from being executable on computing system 100. Subsequent to the removal of those processes from computing system 100, the thin client may forward PIDs of a subset of processes to reinstate and in response to receiving these requests, the thick client may generate live patches that add the removed code of the processes back into the program code at computing system 100.

Figure 2:
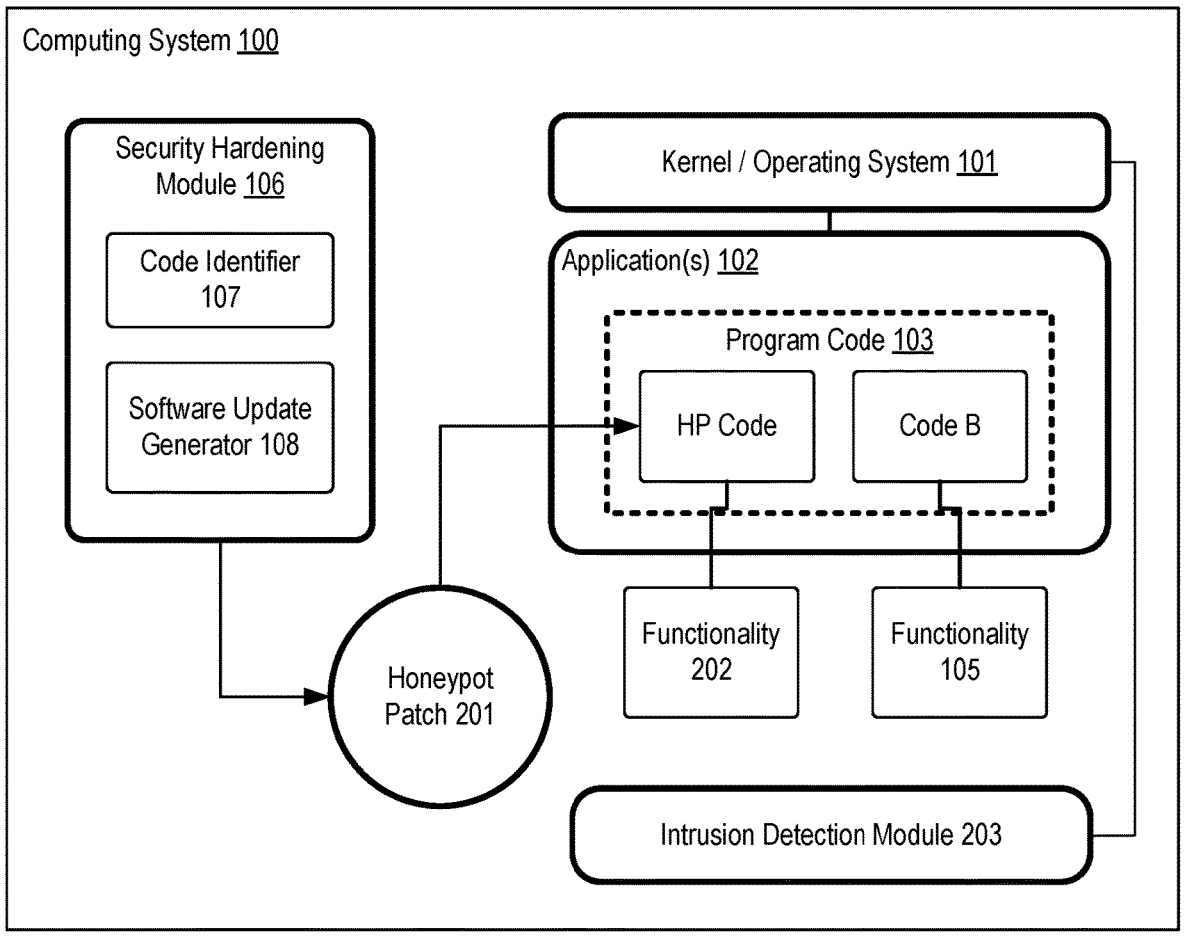
FIG. 2 is a block diagram illustrating a computing system with a security hardening module that generates honeypot patches for intrusion detection, according to an exemplary aspect.

FIG. 2 is a block diagram illustrating computing system 100 with security hardening module 106 that generates honeypot patches for intrusion detection, according to an exemplary aspect. While removing code that is not needed (e.g., because the process associated with the code is not running) using a live patch reduces the attack surface of a software environment, additional security measures can be taken to detect intrusions as well. Referring back to the example of the web browser tab, even if the process of adding a new tab to the web browser is removed, an intruder may attempt to run that process anyway—possibly because the intruder is unaware that the functionality does not exist. In order to detect an intruder trying to execute the process, honeypots may be utilized.

Aspects of the present disclosure are configured to use potentially vulnerable computer systems as an intrusion attack detector or a type of "honeypot" for future intrusion/attack detection and for optionally making a possible attacker believe their attack was successful. A honeypot refers to a type of system that has been configured to be attractive to malicious actors (i.e., software, users). When malicious actors attempt to exploit a honeypot, their attention may be diverted away from other systems (i.e., legitimate, production systems). Moreover, the malicious activity performed on the honeypot may be analyzed/recorded for computer security purposes. In one aspect, live (i.e., production) computing systems can be converted into "honeypots" for software vulnerabilities (e.g., in functionality 104). For purposes of present disclosure, unknown software vulnerabilities may also include so-called "zero-day" vulnerabilities, which may be software security flaws that are known to the software vendor but for which a patch or fix is not ready or available to be used. For example, malicious actor may be interested in exploiting functionality 104 (previously removed) because of a software vulnerability.

A software vulnerability can be manifested in by programming bugs, design flaws, omissions of security checks or input validation, and other types of software errors. It has been determined that when a malicious actor successfully exploits a (known or unknown) software vulnerability, the malicious actor typically performs some actions with the new privileges to get some value out of the exploit. For example, after successfully exploiting a UNIX-like operating system, a malicious process might modify memory of the operating system or other processes, open privileged files, execute a shell or other applications, open sockets, etc.

According to an aspect, software update generator 108 may be configured to generate honeypot patches (e.g., honeypot patch 201) that are configured to convert a computing system with removed processes into a honeypot system. In one aspect, honeypot patch 201 may be comprised of honeypot monitor code for performing intrusion detection based on requests to execute a removed portion of the source code (either periodically or event driven). Honeypot patch 201 replaces and/or adds to program code 103 of applications 102. For example, honeypot patch 201 may replace code A, which is associated with the removed functionality 104, with honeypot (HP) code, which is associated with functionality 202. Functionality 202 may resemble functionality 104 (e.g., both processes may share the same PID). Accordingly, if an intruder attempts an unauthorized execution of functionality 104, functionality 202 is instead executed. Functionality 202 may generate a security event indicating an attempt to exploit a software vulnerability (e.g., an attempt to execute a removed process).

In one aspect, honeypot patch 201 is created as a live patch that is applied to applications 102 using live patching techniques without need for a restart. In some aspects, honeypot patch 201 can be implemented with a live update binary such HP code that is configured to detect attempts to exploit a software vulnerability is merged with the program code 103 of applications 102 to form a modified source code.

In one aspect, the security event involves reporting the detected exploit attempts to a system administrator and/or intrusion detection module 203 via notifications or by other means. Intrusion detection module 203 is configured to react to the exploit attempts detected by HP code of honeypot patch 201. In some aspects, the detected exploit attempts are proactively mitigated by killing and blocking intruder functionalities (e.g., a unauthorized process that is attempting to executed the removed portion). In this example, intrusion detection module 203 may be configured to terminate the malicious functionality and/or block future inter-process communications from the malicious functionality. In some aspects, intrusion detection module 203 may be configured to, in response to detecting the exploit attempts, save the state of the processes for further analysis (e.g. via checkpoint-restore functionality similar to checkpoint restore in user space project, referred to as CRIU, or Virtual Machine snapshots). In some aspects, intrusion detection module 203 may be configured to, in response to detecting the exploit attempts, live migrate the processes associated with the attack or attacking user to an isolated system or virtual machine (for further analysis and/or sandboxing).

In some aspects, security hardening module 106 may disable the loading additional kernel modules (or dynamic libraries in case of user space applications). After this hardening is applied by adding a check and immediate return with error code in the entry function (e.g. in Linux kernel sys_load_module( ) function) additional security measures can be applied with live patching methods. First, the whole binary code of all the functions related to module loading can be wiped out from memory and replaced with a honeypot traps signaling about kernel exploit attempts. This makes sure that intruder will not be able to load module by using separate deeper sub-functions related to module loading process. Second, additional honeypot detectors can be added related to the functionality state itself. For example, honeypot detectors can verify that no state related to the modules has changed (e.g., state of a list of modules or executable areas and pages, no file system, tty, vma and other methods and operations referring to the code outside known modules previously loaded).

Another example of security hardening combined with honeypot detectors may be per user processes isolation. If the kernel is hardened to make sure one user cannot see processes related to other users (including their numeric identifiers), than a whole set of additional honeypot detectors can be added to the system. Thus, if a non-visible process sends a signal to another user, security hardening module 106 should be able to determine that the non-visible process should not have been accessible, thus triggering a security event.

In some aspects, security hardening module 106 may limit the listing of processes to a particular user, may disable execution of SUID binaries except "sudo" and small set of needed applications, may limit SUID binaries in what they can do to avoid issues like CVE-2018-14634 allowing penetration to the system, or may enable additional audit tracking of events like marking all newly created files with xattr, storing application and user names created the file in question. Security hardening module 106 may also track the remote IP address which spawned a malicious process or modified/created a file. Together with honeypot detection, this information can be used to block remote access for the intruder.

Figure 3:
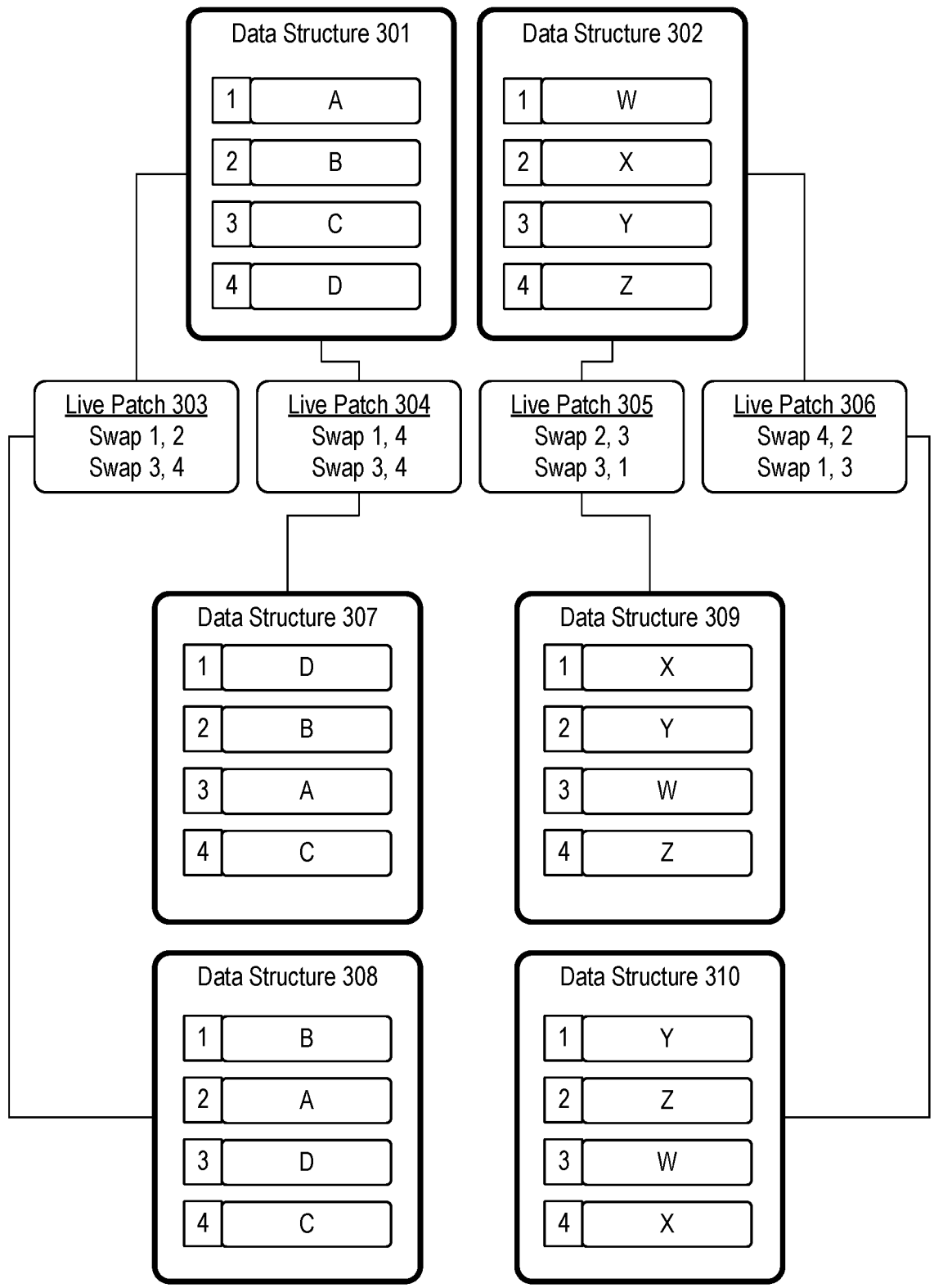
FIG. 3 is a block diagram illustrating data randomization techniques using live patching for attack surface reduction, according to an exemplary aspect.

FIG. 3 is a block diagram illustrating data randomization techniques using live patching for attack surface reduction, according to an exemplary aspect. In the previous methods, the attack surface of applications 102 is reduced by removing functionality not utilized from memory. To further reduce the attack surface of applications 102, security hardening module 106 may identify the functionality that is currently utilized and randomize the data within the data structures being accessed by the utilized functionality. As a result, if an intruder attempts to access a data structure element to retrieve some type of desired data, the intruder will instead access undesired data. Referring back to the example of functionality 104, which may generate a new tab in a web browser, functionality 104 may access data structures 301 and 302. Suppose that data structure 301 represents auto-fill information that functionality 104 uses to load a URL, a username, a password, etc., for a particular website that is initiated when a new tab is created. In this example, element 1 of data structure 301 contains data A, which may be the website URL, element 2 contains data B, which may be the username, and element 3 contains data C, which may be the password associated with the username.

If functionality 104 is a process, software update generator 108 may receive the PID of functionality 104 from code identifier 107. Code identifier 107 may further indicate that functionality 104 is currently running on computing system 100. In response to determining that functionality 104 is running, software update generator 108 may identify data structures associated with functionality 104 (e.g., data structures 301 and 302) and select a data randomization live patch from a plurality of data randomization live patches. For example, the plurality of data randomization live patches may comprise live patches 303, 304, 305 and 306. In FIG. 3, each live patch includes pseudo-code indicating a technique of how the live patch will alter the data values within a data structure. For example, live patch 303 first swaps the first and second elements in a data structure and then swaps the third and fourth elements of the data structure. When applying live patch 303 on data structure 301, the contents of data structure 301, namely, [A, B, C, D] become [B, A, D, C].

Software update generator 108 may add an additional layer of randomization by randomly selecting a live patch from the plurality of data randomization live patches to apply to a given data structure. For example, identifiers of live patches 303, 304, 305 and 306 may be stored in an array of security hardening module 106. Software update generator 108 may execute a program that selects, from the array, an identifier of a live patch using a function such as rand( ) Once an identifier is selected, software update generator 108 modifies program code 103 of applications 102 using the randomly selected data randomization live patch.

Data randomization is specifically performed as follows. During the compiling of an application/kernel, the compiler or an intermediate compilation preprocessor can identify data structures, the layouts of the data structures, and the data values of the data structure. The compiler may generate any given number of output combinations where fields are reordered. This output is further compiled or linked into final binary executable code for each reordering configuration.

FIG. 3 provides a variety of combinations of data structures and live patches. For example, for data structure 301, software update generator 108 may randomly select live patch 304. As a result, program code 103 is modified using live patch 304 such that the contents of data structure 301 resembles the contents shown in data structure 307 (a modified version of data structure 301). Similarly, data structures 309 and 310 represent modified versions of data structure 302 when program code 103 is modified using live patches 305 and 306, respectively.

In some aspects, a combination of live patches may be applied to a particular data structure. For example, program code 103 may be modified by live patch 303, followed by live patch 304. Accordingly, the contents of data structure 301 are altered by swapping elements (1, 2), (3, 4) and then (1, 4) and (3, 4). This would result in the modified data structure to have contents in the following order [C, A, B, D].

Referring back to the example of auto-filling information in a newly-opened web browser tab, an intruder may attempt to access the password (e.g., data C) found in element 3 of data structure 301. Subsequent to modification of program code 103 using live patch 304 (resulting in data structure 301 becoming data structure 307), the intruder would instead access data A, which may be the URL of the website. In some aspects, software update generator 108 may apply a data randomization live patch for a particular data structure whenever an attempt to access the data structure is detected. For example, after element 3 is accessed by the intruder, intrusion detection module 203 may inform security hardening module 106 of an attempt to access data structure 301. In response to receiving this information, software update generator 108 may randomly select a new live patch from the plurality of data randomization live patches to rearrange data structure 301 again. This allows the reduced attack surface to be maintained because the intruder cannot learn that element 3 contains false information and narrow the search to elements 1, 2 and 4. Because the data is be randomized periodically, or in response to access attempt detections, at any given time, the desired information may be in element 3. An unauthorized brute-force attempt to access the desired information is thus thwarted.

It should be noted that the data structures may have additional information stored in them. For example, in data structure 302, each data value (W, X, Y, Z) may be a pointer to a unique function. Following the same logic, if an intruder does not know the address of a particular function, the intruder cannot directly and there is a risk to reveal himself while probing different addresses. Thus, an intruder trying to change W will modify Z in reality and risks to reveal himself due to potential malfunctioning of the system. The more fields that a data structure has, the more combinations for reordering the fields can be generated. For small data structures multi-byte fields can be split into separate bytes and reordered as such to generate greater number of combinations. Such live patches can be re-applied to the system from time to time to change the layout during life time of the system rather than to select layout once on its start.

Figure 4:
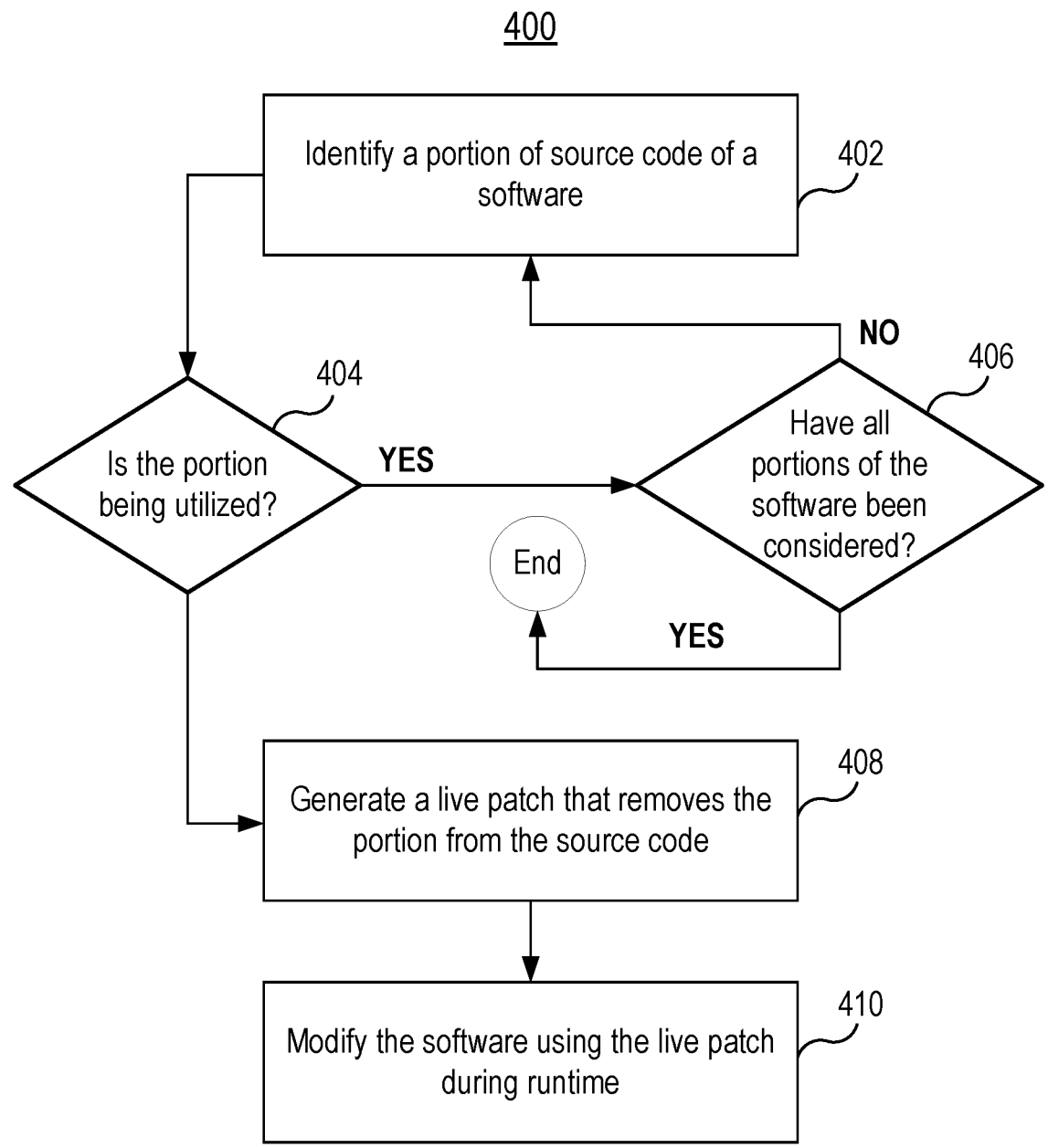
FIG. 4 is a flowchart illustrating a method for modifying a software using a live patch to remove unused functionality from memory, according to an exemplary aspect.

FIG. 4 is a flowchart illustrating method 400 for modifying a software using a live patch to remove unused functionality from memory, according to an exemplary aspect.

At 402, security hardening module 106, as executed by a hardware processor of computing system 100, identifies a portion of source code of a software. Referring to FIG. 1, the identified portion may be code B of program code 103, which is associated with functionality 104, and the software may be applications 102.

At 404, security hardening module 106 determines whether the portion of source code is being utilized. In response to determining that the portion is being utilized, method 400 proceeds to 406, where security hardening module 106 determines whether all portions of the software have been considered. For example, code identifier 107 of security hardening module 106 may determine that functionality 104 is currently running and that another functionality of applications 102 exists.

At 406, if security hardening module 106 determines that there are no other portions to consider (i.e., all functionalities of applications 102 are running and are necessary), method 400 ends. In the example of FIG. 1, because functionality 105 exists, method 400 returns to 402 where code identifier 107 of security hardening module 106 identifies functionality 105. Suppose that subsequently at 404, code identifier 107 determines that functionality 105 is not running—method 400 proceeds to 408.

At 408, software update generator 108 of security hardening module 106 generates a live patch that removes the portion (e.g., code B), from the source code (e.g., program code 103).

At 410, security hardening module 106 modifies the software using the live patch during runtime. For example, security hardening module 106 may modify applications 102 using live patch 109. Subsequent to live patch 109 being applied using a live patching technique, functionality 105 is no longer executable.

Figure 5:
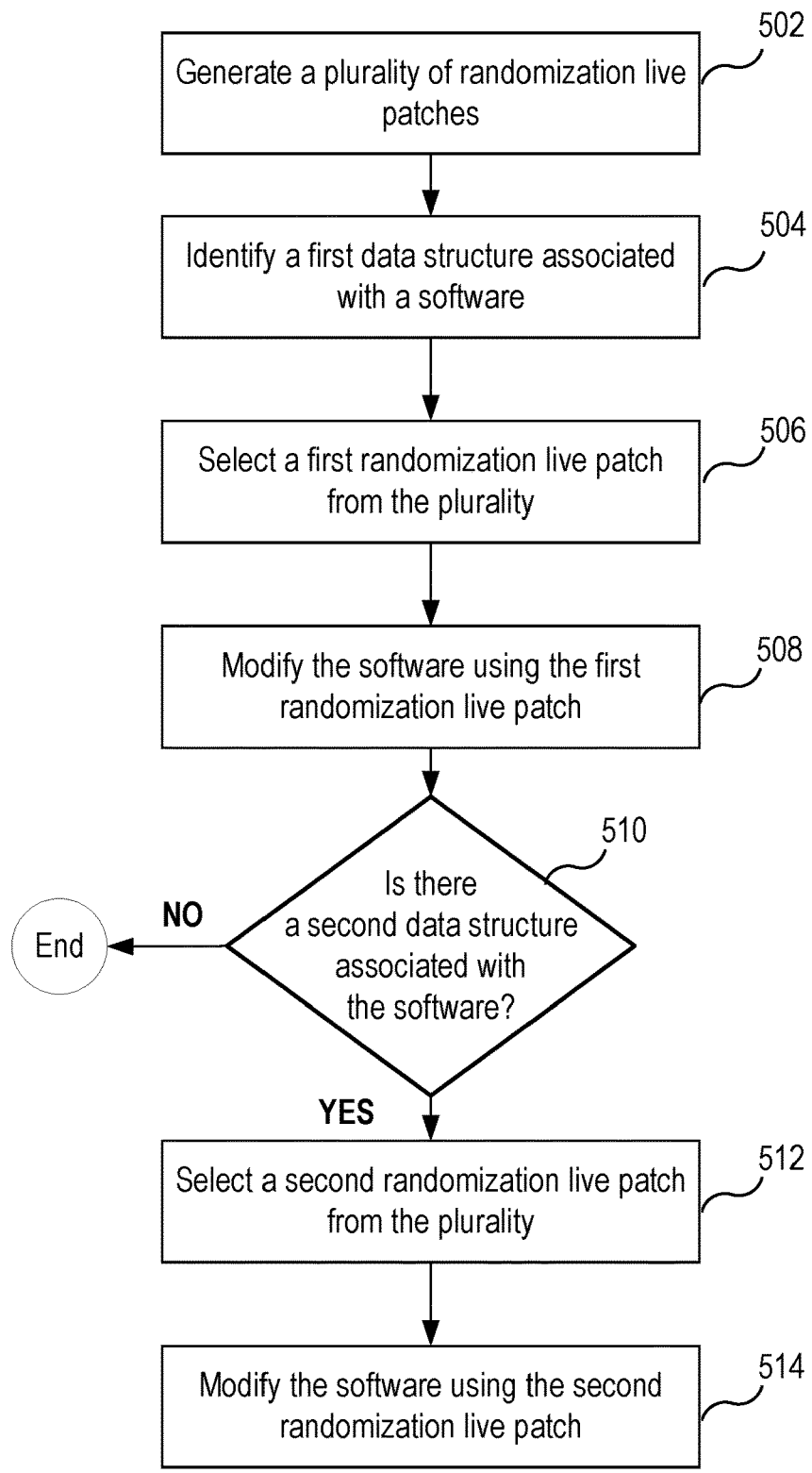
FIG. 5 is a flowchart illustrating a method for modifying a software using live patches that randomize data values in data structures associated with a software, according to an exemplary aspect.

FIG. 5 is a flowchart illustrating method 500 for modifying a software using live patches that randomize data values in data structures associated with a software, according to an exemplary aspect. In some aspects, method 500 may be executed by a hardware processor in response to a determination at 404 of method 400 that the identified portion in 402 (e.g., code A of FIG. 1) is being utilized.

At 502, software update generator 108 of security hardening module 106 generates a plurality of randomization live patches. The plurality of randomization live patches may include, for example, live patches 303, 304, 305 and 306 from FIG. 3. At 504, software update generator 108 of security hardening module 106 identifies a first data structure associated with the software. For example, applications 102 may access data structure 301. Accordingly, software update generator 108 determines that data structure 301 is associated with applications 102, and should be subjected to data randomization to reduce the attack surface of applications 102.

At 506, software update generator 108 selects a first randomization live patch from the plurality of randomization live patches. The selection of the first randomization live patch may be random (e.g., using a rand function) to add an additional layer of randomization. Suppose that software update generator 108 randomly selects live patch 303 from FIG. 3. At 508, security hardening module 106 modifies the software using the first randomization live patch. For example, security hardening module 106 may modify applications 102 by applying live patch 303 to program code 103 such that the contents of data structure 301 are arranged to resemble the order of data structure 308.

At 510, security hardening module 106, via software update generator 108, whether there is a second data structure associated with the software. If there are no other data structures associated with the running process, method 500 ends. However, suppose that applications 102 additionally accesses data structure 302. In response to determining that the second data structure (e.g., data structure 302) is associated with applications 102, method 500 proceeds to 512, where software update generator 108 selects a second randomization live patch from the plurality. For example, software update generator 108 may randomly select live patch 306.

At 514, security hardening module 106 modifies the software using the second randomization live patch. For example, security hardening module 106 may apply live patch 306 to program code 103 such that the contents of data structure 302 are arranged to resemble the order of data structure 310. It should be noted that a software may be associated with several data structures. Accordingly, security hardening module 106 may select a unique live patch for data randomization for each of the data structures.

Figure 6:
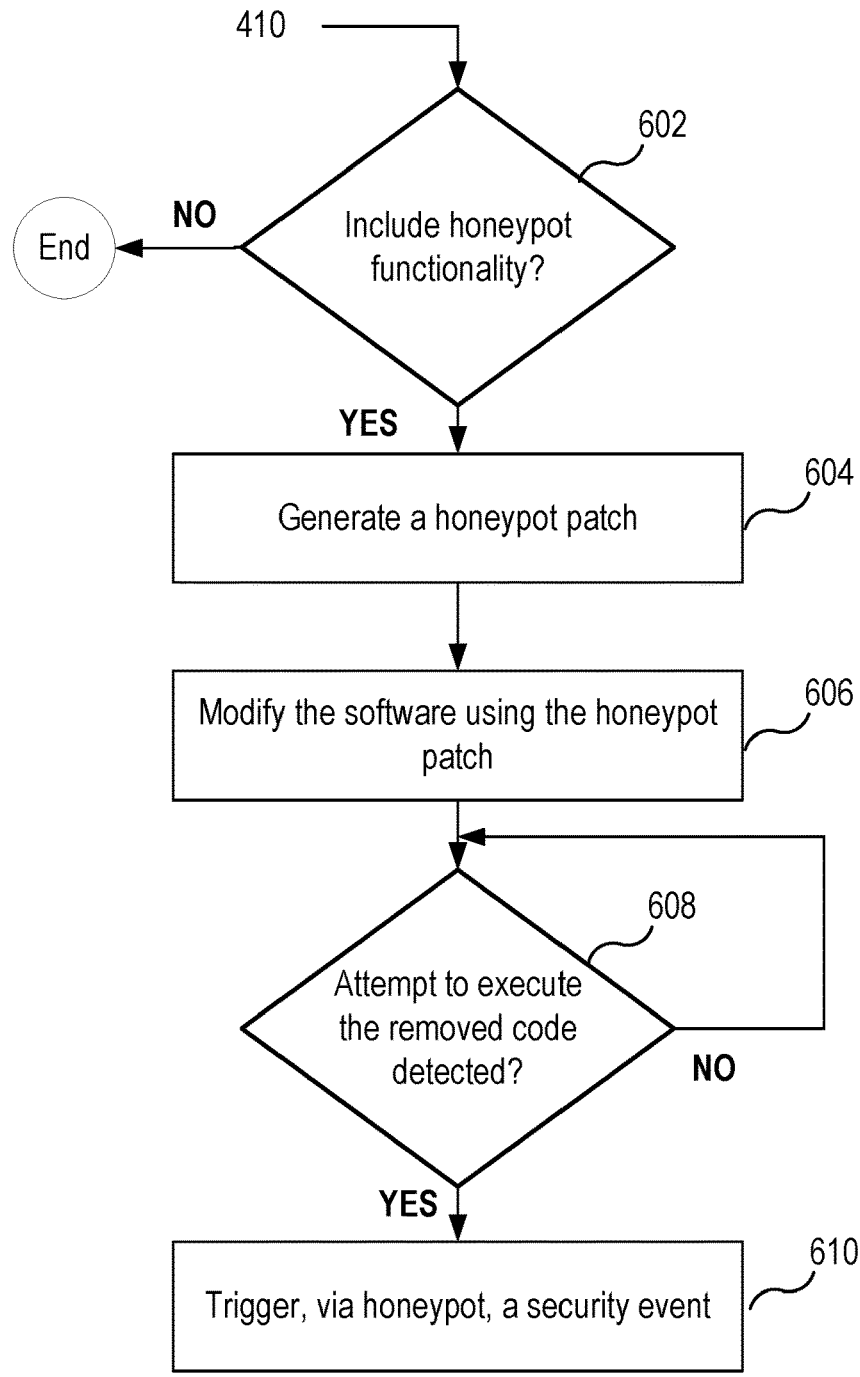
FIG. 6 is a flowchart illustrating a method for modifying a software using a honeypot patch to detect attempts to execute a removed portion of source code, according to an exemplary aspect.

FIG. 6 is a flowchart illustrating method 600 for modifying a software using a honeypot patch to detect attempts to execute a removed process, according to an exemplary aspect. Method 600 may be executed by a hardware processor of computing system 100 subsequent to 410 of method 400.

At 602, security hardening module 106 determines whether to include honeypot functionality as a replacement to a removed portion of code (e.g., such that the functionality of the honeypot is executed when an unauthorized attempt to execute the removed portion is detected). In some aspects, security hardening module 106 may determine whether the removed code is associated with a software vulnerability that would lure a malicious actor (e.g., an intruder). If the removed code is associated with a software vulnerability, security hardening module 106 may determine that honeypot functionality should be included in the software. In some aspects, security hardening module 106 may allow a system administer or an authorized user to input a preference of whether to include honeypot functionality.

If at 602, security hardening module 106 determines that honeypot functionality should be not be included, method 600 ends. Otherwise, method 600 proceeds to 604, where software update generator 108 of security hardening module 106 generates a honeypot patch. At 606, security hardening module 106 modifies the software using the honeypot patch. Referring to FIG. 2, suppose that functionality 104 was previously removed. Software update generator 108 may generate honeypot patch 201, which detects attempts to execute functionality 104 and creates a security event. Specifically, honeypot patch 201 modifies program code 103 by replacing code A of functionality 104 with HP code of functionality 202.

At 608, functionality 202 detects attempts to execute the removed functionality. In response to detecting an unauthorized attempt to execute the removed functionality, functionality 202 triggers a security event at 610. This security event may then be managed by intrusion detection module 203. When detecting unauthorized attempts, functionality 202 may specifically examine an access token of the entity trying to access the removed functionality and may determine whether the access token belongs to an authorized set of access tokens. It should be noted that an access token may contain security credentials for a login session and identifies the user as well as the user's groups and privileges.

Figure 7:
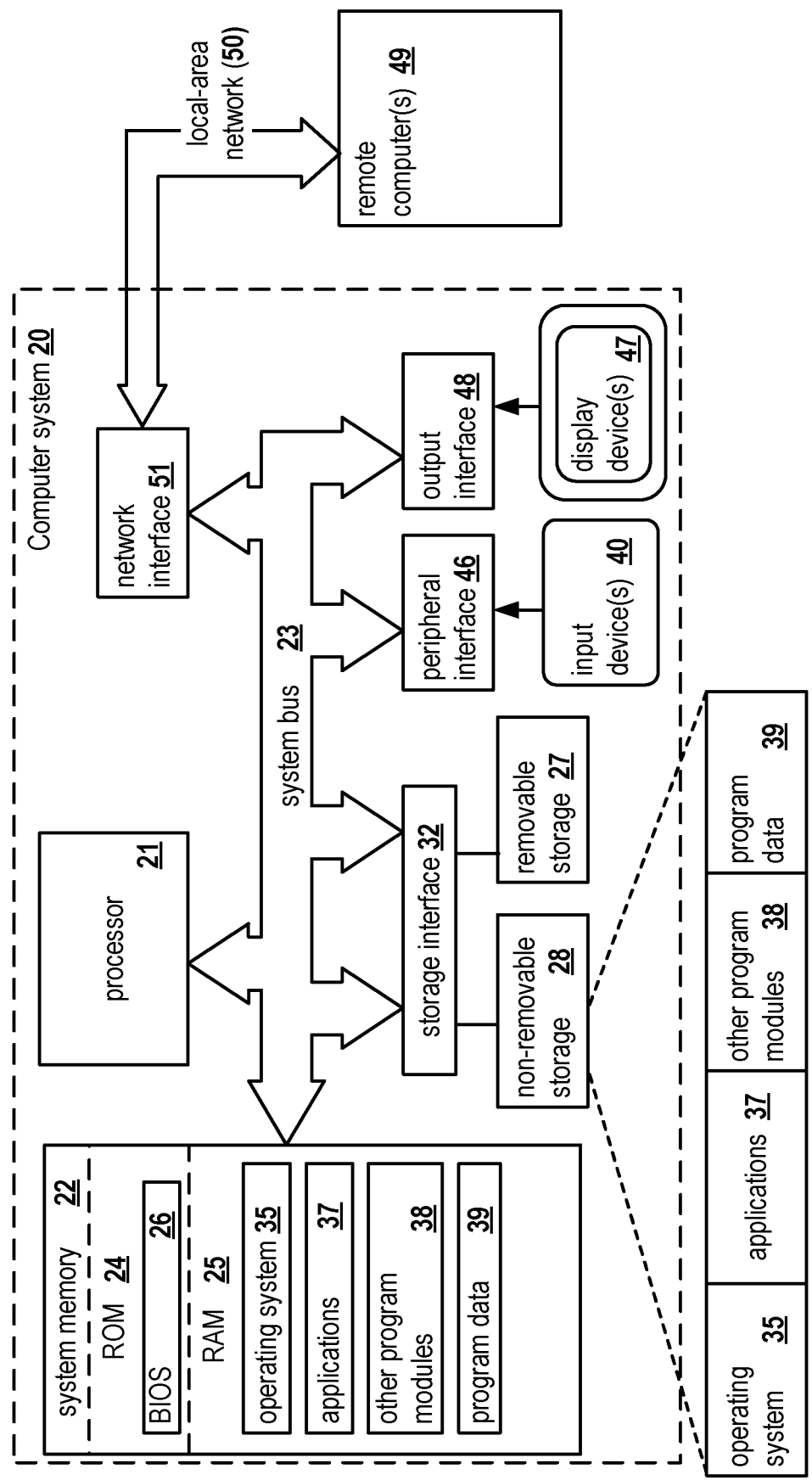
FIG. 7 is a block diagram of a computer system on which the disclosed system and method can be implemented according to an exemplary aspect.

FIG. 7 is a block diagram illustrating a computer system 20 on which aspects of systems and methods for attack surface reduction using live patching may be implemented in accordance with an exemplary aspect. It should be noted that the computer system 20 can correspond to the computing system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for patching software, the method comprising:
    identifying a portion of code of a software, the software comprising at least one of: an operating system and an application;
    determining whether the portion of the code is being utilized;
    in response to determining that the portion of the code is not being utilized, generating, during runtime, a first live patch that replaces the portion with program code of a honeypot, wherein the program code of the honeypot generates a security event in response to detecting an attempt to exploit a software vulnerability;

modifying, during the runtime, the software using the first live patch without restarting the software, wherein the modifying comprises removing the portion from the code such that the portion cannot be executed;

subsequent to the modifying, detecting a request to execute the portion;

in response to determining that the request is from an authorized user of the software:
generating a second live patch that adds the removed portion to the code; and
modifying, during the runtime, the software using the second live patch without restarting the software, wherein the modifying using the second live patch comprises adding the removed portion to the code such that the portion can be executed instead of the program code of the honeypot;

in response to determining that the request is not from the authorized user of the software, generating the security event.

2. The method of claim 1, wherein the portion of the code of the software is a first portion, further comprising:
identifying a second portion of the code of the software that is utilized while the first portion is not being utilized;
subsequent to modifying the software using the second live patch, determining that the second portion is no longer being utilized;
generating, during the runtime, a third live patch that replaces the second portion with the program code of the honeypot; and
modifying, during the runtime, the software using the third live patch.

3. A system for patching software, the system comprising:
a hardware processor configured to:
identify a portion of code of a software, the software comprising at least one of: an operating system and an application;
determine whether the portion of the code is being utilized;
in response to determining that the portion of the code is not being executed, generate during runtime, a first live patch that replaces the portion with program code of a honeypot, wherein the program code of the honeypot generates a security event in response to detecting an attempt to exploit a software vulnerability;
modify, during the runtime, the software using the first live patch without restarting the software, wherein the modifying comprises removing the portion from the code such that the portion cannot be executed;
subsequent to the modifying, detect a request to execute the portion;
in response to determining that the request is from an authorized user of the software:
generate a second live patch that adds the removed portion to the code; and
modify, during the runtime, the software using the second live patch without restarting the software, wherein the modifying using the second live patch comprises adding the removed portion to the code such that the portion can be executed instead of the program code of the honeypot;

in response to determining that the request is not from the authorized user of the software, generate the security event.

4. The system of claim 3, wherein the portion of the code of the software is a first portion, and wherein the hardware processor is further configured to:
identify a second portion of the code of the software that is utilized while the first portion is not being utilized;
subsequent to modifying the software using the second live patch, determine that the second portion is no longer being utilized;
generate, during the runtime, a third live patch that replaces the second portion with the program code of the honeypot; and
modify, during the runtime, the software using the third live patch.

5. A non-transitory computer readable medium comprising computer executable instructions for patching software, including instructions for:
identifying a portion of code of a software, the software comprising at least one of: an operating system and an application;
determining whether the portion of the code is being utilized;
in response to determining that the portion of the code is not being utilized, generating, during runtime, a first live patch that replaces the portion with program code of a honeypot, wherein the program code of the honeypot generates a security event in response to detecting an attempt to exploit a software vulnerability;
modifying, during the runtime, the software using the first live patch without restarting the software, wherein the modifying comprises removing the portion from the code such that the portion cannot be executed;
subsequent to the modifying, detecting a request to execute the portion;
in response to determining that the request is from an authorized user of the software:
generating a second live patch that adds the removed portion to the code; and
modifying, during the runtime, the software using the second live patch without restarting the software, wherein the modifying using the second live patch comprises adding the removed portion to the code such that the portion can be executed instead of the program code of the honeypot;

in response to determining that the request is not from the authorized user of the software, generating the security event.

6. The non-transitory computer readable medium of claim 5, wherein the portion of the code of the software is a first portion, further comprising instructions for:
identifying a second portion of the code of the software that is utilized while the first portion is not being utilized;
subsequent to modifying the software using the second live patch, determining that the second portion is no longer being utilized;
generating, during the runtime, a third live patch that replaces the second portion with the program code of the honeypot; and
modifying, during the runtime, the software using the third live patch.

* * * * *